July 9, 1963

F. L. LE BUS, SR 3,097,001

UNLATCHING JOINT APPARATUS

Filed June 8, 1959

INVENTOR.
F. L. Le Bus Sr.
BY
C. M. McKnight
ATTORNEY

July 9, 1963

F. L. LE BUS, SR 3,097,001

UNLATCHING JOINT APPARATUS

Filed June 8, 1959

INVENTOR.
F. L. LeBus Sr.

BY
C. M. McKnight
ATTORNEY

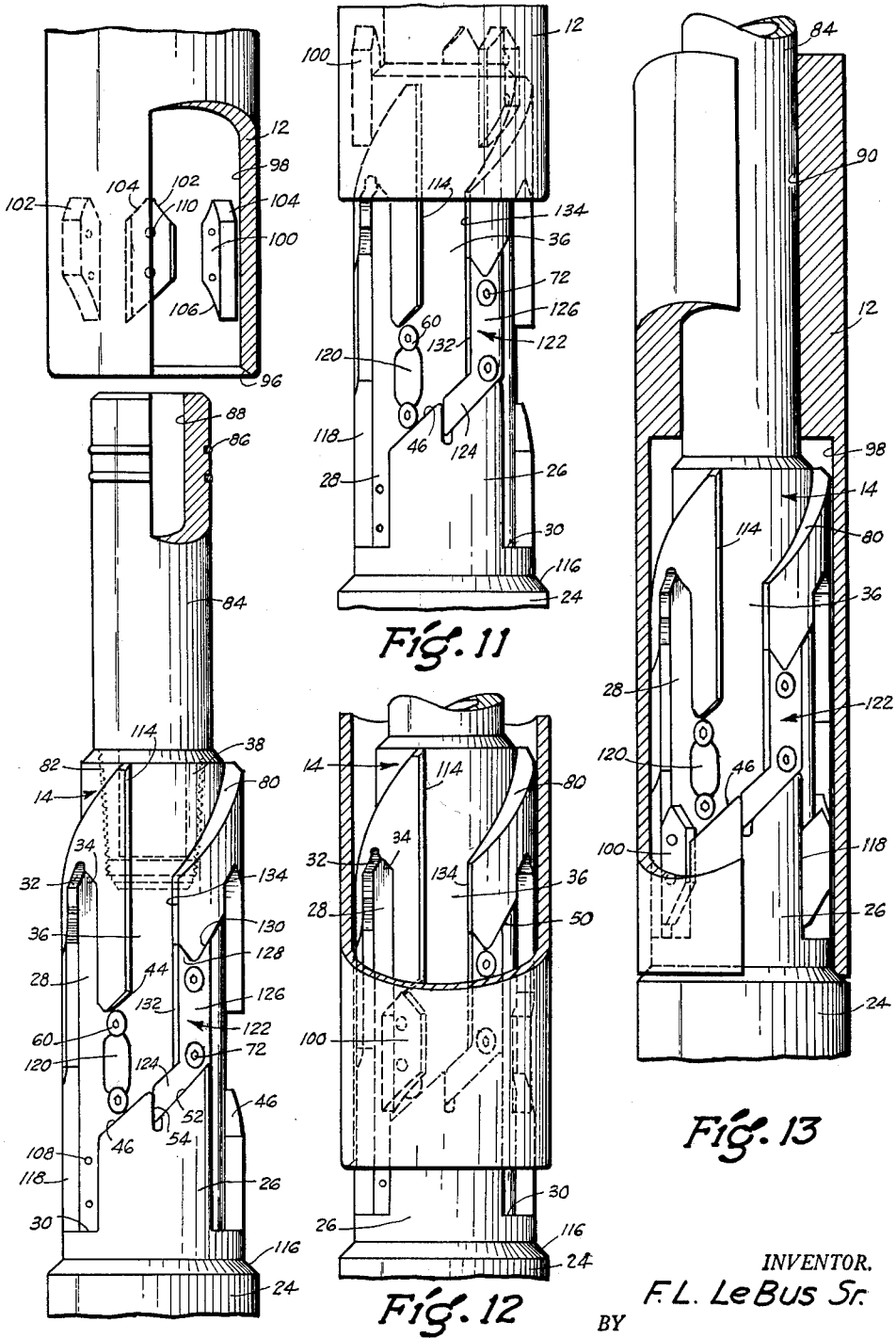

July 9, 1963   F. L. LE BUS, SR   3,097,001
UNLATCHING JOINT APPARATUS
Filed June 8, 1959   5 Sheets-Sheet 5
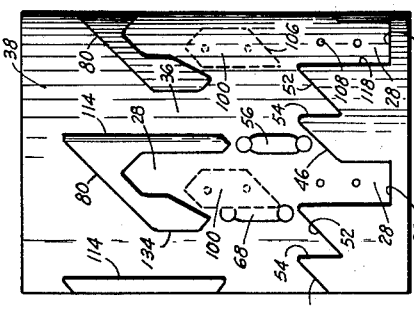
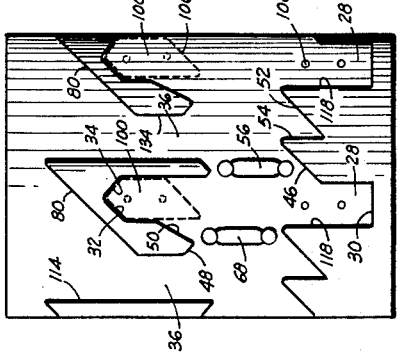
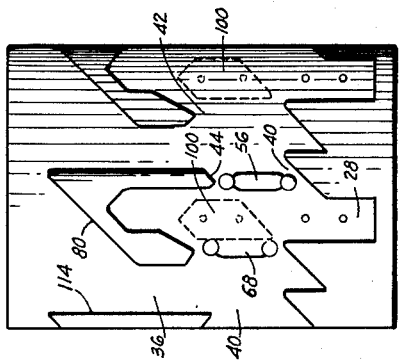
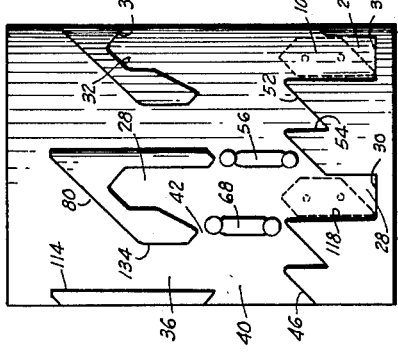
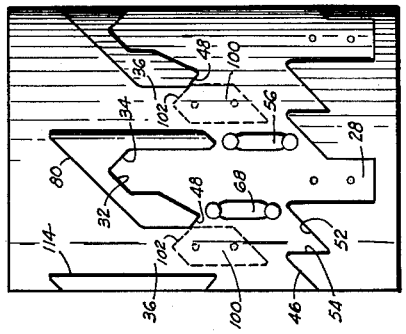
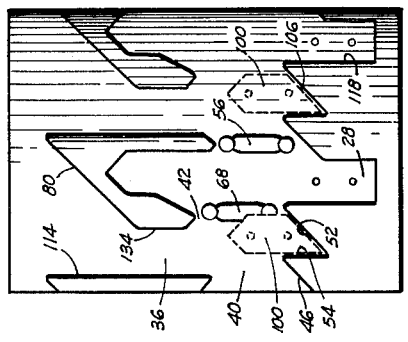
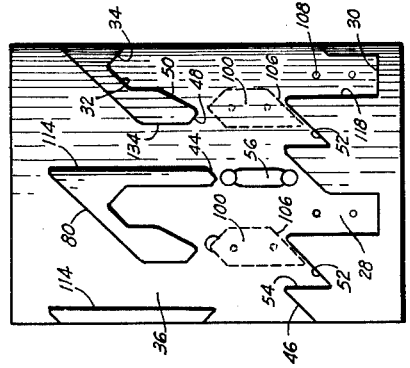
INVENTOR.
F. L. Le Bus Sr.
BY
ATTORNEY United States Patent Office 3,097,001
Patented July 9, 1963

3,097,001
UNLATCHING JOINT APPARATUS
Franklin L. LeBus, Sr., Longview, Tex., assignor to LeBus Royalty Company, Longview, Tex., a partnership
Filed June 8, 1959, Ser. No. 818,687
10 Claims. (Cl. 285—361)

This invention relates to improvements in well drilling apparatus, and more particularly, but not by way of limitation, to a safety joint to be used with drill stems and fishing tools in the drilling of deep well bores.

In the drilling of well bores, and particularly deep well bores, the drill stem frequently does not bore a true vertical path downwardly through the subsurface formations due to variations in the hardness of the geological structure. The drill bit and a portion of the drill stem connected thereto may become lodged in the well bore whereby the drilling operation cannot be continued without a loosening thereof. It is desirable in such instances to remove the upper portion of the drill stem from the well bore in order that the stuck fish may be loosened from the key seat, or the like, in the formation wherein it is stuck.

An unlatching joint or safety joint is frequently interposed in the drill stem in order to facilitate the disconnection of the upper portion from the lower portion thereof. The safety joint is normally provided with a pair of tubular connecting members which may be uncoupled somewhat more easily than any of the other threaded pipe joint connections in the drill stem, thus providing for a disconnection of the drill stem at a pre-determined location therein. Part of the safety joint is then withdrawn from the well bore along with the upper portion of the drill stem, while the remaining portion of the safety joint is left in the well bore with the stuck fish. The upper end of the stuck fish having the safety joint member connected thereto may then be more readily re-engaged during the fishing operation.

The stuck fish is normally engaged by a suitable fishing tool and washed or reamed loose from the key seat for recovery thereof. During the fishing operation, the fishing tool, as well as the reaming apparatus, may also become lodged in the well bore. It will be apparent that it is usually desirable to interpose an unlatching joint in the drill stem or drill string above the fishing tool and reaming apparatus to facilitate retrieving thereof in the event that either tool becomes stuck in the well bore.

There are many types of safety joints available today, but they have many disadvantages in practical use. For example, the usual safety joint is provided with a threaded type connection which depends upon rotational motion or torque for a disconnection thereof. However, under actual working conditions, it is frequently found that the torque applied to the drill stem for breaking the safety joint connection results in the breaking of one of the pipe joint connections in the drill stem instead of the safety joint connection. It will be apparent that this is detrimental and complicates the fishing operation. In addition, the safety joint is normally designed in such a manner that the box portion of the threaded type connection thereof remains in the well bore along with the stuck fish while the pin portion is withdrawn from the well bore with the upper portion of the drill stem. Thus, upon retrieving of the stuck fish, the pin portion is moved downwardly through the well bore for engagement with the box portion. As the pin moves downwardly and begins to approach the box, the circulating well fluid and debris contained therein is forced into the box by the pin and greatly hinders the connection therebetween. In some instance, it becomes substantially impossible to engage the pin in the box.

The present invention contemplates a novel safety joint wherein both the latching and unlatching thereof is accomplished through a combined vertical downward movement and rotational movement. The novel safety joint provides a pair of tubular members secured together by means of cooperating spline members whereby a right hand rotational torque combined with the vertical movement is required for a disconnection therebetween. The right hand torque required for the disconnection of the safety joint eliminates the possibility of breaking one of the pipe joint connections of the drill stem instead of the safety joint connection. However, the spline members of the safety joint may be quickly and easily altered to provide for a disconnection therebetween or unlatching through a combined vertical movement and left hand torque in the event the operator so desires. The torque required for the disconnection of the safety joint is not dependent upon any tightness of a make-up of a threaded connection, and thus eliminates the possibility of an accidental breaking of one of the pipe joints even when the left hand releasing torque is utilized in lieu of the right hand torque.

Furthermore, the novel unlatching joint of the present invention is particularly designed and constructed whereby the pin portion thereof remains in the well bore with the stuck fish and the box portion is removed from the well bore with the upper portion of the drill stem. Thus, upon a retrieving of the stuck fish, the upwardly extending pin member is washed clean by the downwardly circulating well fluid as the box portion is moved downwardly in the well bore for a connection therewith. It will be apparent that the connection therebetween may be quickly and readily accomplished.

It is an important object of this invention to provide an unlatching joint adapted to be interposed in a drill stem for facilitating the loosening and recovery of a stuck fish in a well bore.

It is another object of this invention to provide a safety joint for a drill stem particularly designed and constructed for a disconnection thereof in a manner to preclude accidental disconnection of the pipe joints in the drill stem.

Another object of this invention is to provide a novel safety joint wherein a combined vertical downward movement and rotational torque in a right hand direction is required for latching and unlatching thereof.

Still another object of this invention is to provide a safety joint which may be quickly and easily modified in order that a vertical movement combined with a left hand torque may be utilized for the unlatching thereof.

It is a further object of this invention to provide a safety joint so constructed to facilitate a re-engagement thereof after a disconnection thereof for enhancing the retrieving of a stuck fish in a well bore.

An additional object of this invention is to provide a novel safety joint which may be utilized as a bumper or jar for facilitating the loosening or dislodging of a stuck fish in a well bore.

It is a still further object of this invention to provide a safety joint which is simple and efficient in operation and economical and durable in construction.

Other objects and advantages of the invention will be evident from the following detailed description, read in conjunction with the accompanying drawings, which illustrate my invention.

In the drawings:

FIGURE 10 is a broken elevational view partly in section of a modified version of the safety joint, and depicted in a disconnected position.

FIGURE 11 is a broken elevational view of the spline members of the modified safety joint depicting the spline members in the beginning position of the engagement therebetween.

FIGURE 12 is a view similar to FIG. 11, partly in section, depicting the spline members in a further position of engagement.

FIGURE 13 is a view similar to FIG. 12 depicting the spline members in a drive position.

FIGURE 18 is a view similar to FIG. 15 depicting the spline members in a drive position.

FIGURE 19 is a view similar to FIG. 15 depicting the the spline members in still another position of engagement therebetween.

FIGURE 20 is a view similar to FIG. 15 depicting the spline members in another drive position.

FIGURE 21 is a view similar to FIG. 15 depicting the spline members in the beginning position for unlatching of the safety joint.

FIGURE 22 is a view similar to FIG. 15 depicting the spline members in a more advanced position of unlatching.

FIGURE 23 is a view similar to FIG. 15 depicting the spline members in still another position for unlatching of the safety joint.

FIGURE 24 is a view similar to FIG. 15 depicting the spline members in still another position for unlatching of the safety joint.

Figure 1:
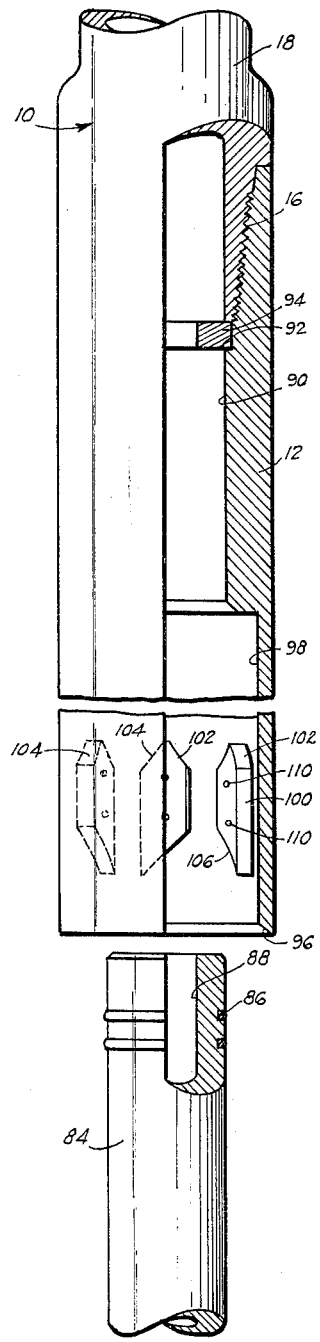
FIGURE 1 is a broken elevational view partly in section of the upper portion of the novel safety joint in a disconnected or released position.

Referring to the drawings in detail, and particularly FIG. 1, reference character 10 refers in general to a safety joint comprising an outer tubular sleeve or drive body 12 adapted to be telescopically arranged with respect to an inner splined sleeve 14. The outer sleeve 12 is threadedly secured at 16 to a drill pipe 18, or the like, and the splined sleeve 14 is threadedly secured at 20 to a second drill pipe 22 for interposing the safety joint 10 in the drill stem. It will be apparent that the safety joint 10 may be interposed in a fishing tool (not shown), if desired, and is not limited to utilization with a drill stem.

The splined sleeve 14 comprises a body portion 24 having an upwardly extending reduced neck portion 26 provided thereon. A plurality of longitudinally extending grooves 28 are circumferentially spaced on the outer periphery of the reduced neck 26. The lower end of each groove 28 is closed by a substantially horizontal shoulder 30, and the upper end of each of the grooves 28 is closed by a pair of angularly disposed converging shoulders 32 and 34. A plurality of longitudinally extending grooves 36 are interposed between the grooves 28 and are open at the upper end 38 thereof for a purpose as will be hereinafter set forth. Each of the grooves 36 is in communication with the pair of grooves 28 disposed on opposite sides thereof. An angularly disposed circumferential groove 40 provides communication between the groove 36 and the groove 28 disposed to the left thereof, as viewed in FIG. 1, and a second circumferential groove 42 provides communication between the groove 36 and the groove 28 disposed to the right thereof. The upper end of the groove 40 is closed by an angularly or substantially V-shaped shoulder 44, and the lower end thereof is closed by a complementary angular shoulder 46. The upper end of the groove 42 is closed by a pair of angularly disposed converging shoulders 48 and 50, and the lower end thereof is closed by an angularly disposed shoulder 52 and a complementary vertical shoulder 54.

Figure 3:
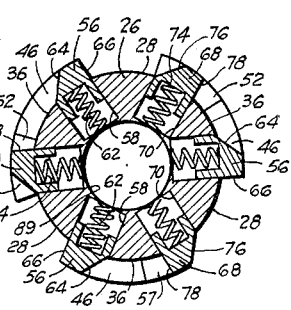
FIGURE 3 is a view taken on line 3—3 of FIG. 2.
Figure 4:
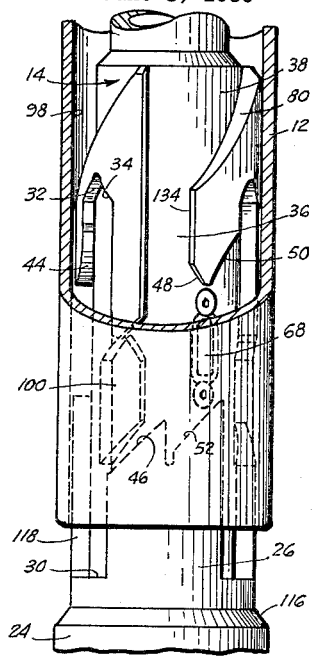
FIGURE 4 is a view similar to FIG. 2, partly in section, depicting another position of engagement between the spline members.

A latch member 56 is disposed in a slot or recess 58 (FIG. 3) provided in each of the circumferential grooves 40 and is secured therein by a pair of oppositely disposed latch screws 60. A helical spring 62 is disposed in each recess 58 and bears against the latch 56 therein for constantly urging the latch radially outward for a purpose as will be hereinafter set forth. Each latch 56 is provided with a tapered face 64 adjacent the respective groove 36, and a straight vertical shoulder 66 adjacent the respective groove 28 for a purpose as will be hereinafter set forth.

A latch member 68 is disposed in a recess 70 provided in each of the circumferential grooves 42 and secured therein by a pair of oppositely disposed latch screws 72. A helical spring 74 is disposed in each of the recesses 70 and bears against the latch 68 therein for constantly urging the latch in a radially outward direction. Each of the latches 68 is provided with a tapered face 76 adjacent the respective groove 28 and a straight vertical shoulder 78 adjacent the respective groove 36.

Figure 8:
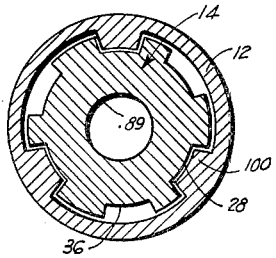
FIGURE 8 is a view taken on line 8—8 of FIG. 6.

A helical shoulder 80 is provided at the top of the spline body 14 and coterminous with the open end 38 of the groove 36 for facilitating access to the groove 36 as will be hereinafter set forth. An internal threaded portion 82 is provided at the top of the spline body for receiving a packing stem 84 therein. A plurality of spaced packing ring members 86 are provided on the packing stem 84 for cooperating with the outer sleeve 12 to preclude leakage of fluid therebetween. However, it is to be noted that the safety joint 10 may be utilized without the packing stem 84, if desired. A bore 88 (FIG. 1) extends longitudinally through the stem 84 and is in communication with a central longitudinal bore 89 (FIGS. 3 and 8) extending through the spline sleeve 14 to provide for fluid circulation through the safety joint 10.

The outer sleeve 12 is provided with a central longitudinal bore 90 extending downwardly therein for telescopically receiving the packing stem 84. The periphery of the bore 90 is preferably polished whereby the packing rings 86 will effectively seal thereagainst for precluding leakage of fluid around the packing stem 84. An inwardly extending circumferential shoulder 92 is provided on the inner periphery of the sleeve 12 above the bore 90 to receive an annular stop ring member 94. The stop ring 94 is retained in position within the sleeve 12 by the drill pipe 18, as clearly shown in FIG. 1, and functions to limit the upward movement of the packing stem 84 within the bore 90. In addition, the lower end 96 of the sleeve 12 is inwardly tapered for contacting the body 24 of the spline sleeve 14 for limiting the upward movement of the spline sleeve 14 with respect to the sleeve 12 when the packing stem 84 is not utilized therewith.

The bore 90 is enlarged at 98 for receiving the reduced neck portion 26 of the spline body 14 therein. A plurality of circumferentially spaced lug members 100 are provided on the inner periphery of the enlarged bore 98 for cooperation with the spline body 14, as will be hereinafter set forth. The upper end of each lug 100 is provided with a pair of angularly disposed converging shoulders 102 and 104 which are complementary to the converging shoulders 32 and 34 of the grooves 28. The lower end of each lug 100 is provided with a tapered shoulder 106 complementary to the tapered shoulders 46 and 52 of the spline body 14 for facilitating the movement of the lugs 100 with respect to the plurality of grooves provided on the spline body.

Figure 5:
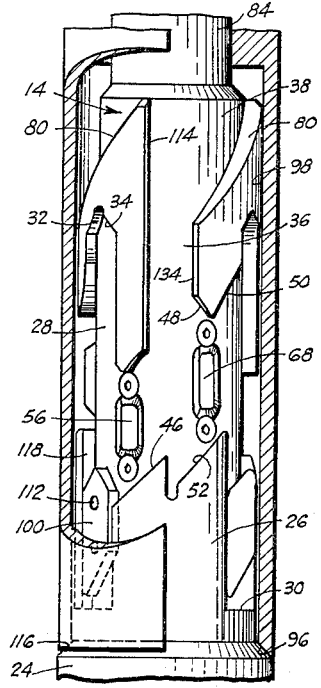
FIGURE 5 is a view similar to FIG. 4 depicting the spline members in a drive position.

A plurality of spaced apertures 108 (FIG. 2) are provided in each of the grooves 28 and spaced from the horizontal shoulder 30 thereof. A plurality of cooperating spaced apertures 110 are provided in each of the male lugs 100 for receiving shear pins 112 (FIG. 5) therethrough while the safety joint 10 is being lowered into the well bore with the drill stem or drill pipe 18 and 22 in preparation for the drilling operation.

Operation

Prior to insertion in the well bore, the safety joint 10 is interposed between any suitable pipe sections 18 and 22 by the threaded connections 16 and 20, as hereinbefore set forth. The drive body 12 is preferably telescoped over the spline body 14 to the position depicted in FIG. 5, and then in this position the shear pins 112 are inserted through the cooperating apertures 108 and 110 for locking the safety joint 10 in the latched position during the lowering of the drill stem, or fishing tool into the well bore to begin the drilling operation. After disposition of the tool in the well bore and during the drilling operation, the drill bit (not shown) may become lodged in the well bore, and it is then desired to remove the upper portions of the drill stem from the bore in order to permit a loosening of the stuck fish. In this situation, the safety joint 10 may be unlatched for a disconnection thereof.

Figure 6:
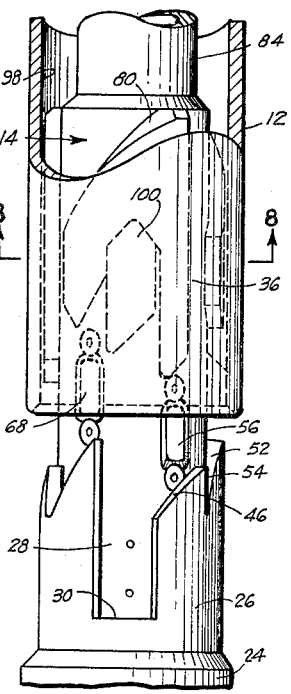
FIGURE 6 is a view similar to FIG. 4 depicting the spline members in another drive position.
Figure 7:
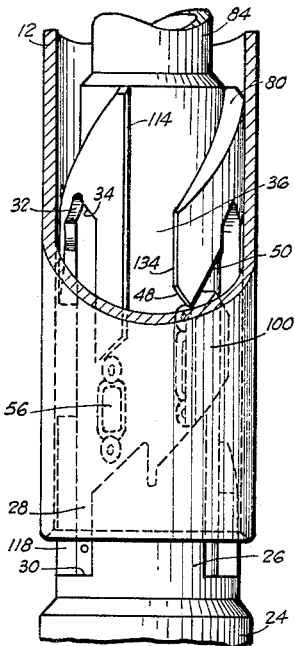
FIGURE 7 is a view similar to FIG. 4 depicting the spline members in a position for beginning the unlatching of the safety joint.

This disconnection or unlatching is accomplished by a vertical upward pull on the drill pipe to cause the outer drive body 12 to move upwardly with respect to the spline body 14, thus shearing the pins 112 and releasing the lugs 100 from the firm or rigid engagement with the spline body. The sleeve 12 will then move upwardly over the spline body 14 until the lugs 100 are brought into engagement with the angular shoulders 32 and 34 at the upper end of the grooves 38, as shown in FIGS. 6 and 20. Further upward movement is precluded due to the connection of the spline body 14 with the stuck portions of the drill stem. The drill stem 18 is then slowly lowered in any well known manner (not shown) with a simultaneous right hand rotation thereof for a simultaneous movement of the drive body 12, whereby the lugs 100 are moved into the groove 42 adjacent the tapered face 76 of the spring latches 68, as shown in FIGS. 7 and 21. The lugs 100 will ride easily over the tapered faces 76 and depress the latches 68 to permit continued movement of the lugs 100 through the groove 42.

Figure 9:
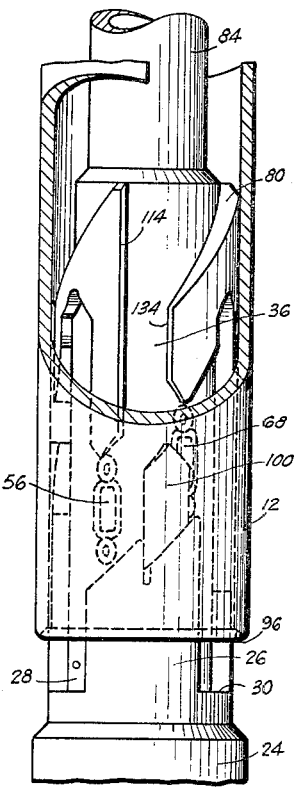
FIGURE 9 is a view similar to FIG. 4 depicting the spline members in another position for unlatching of the safety joint.
Figure 14:
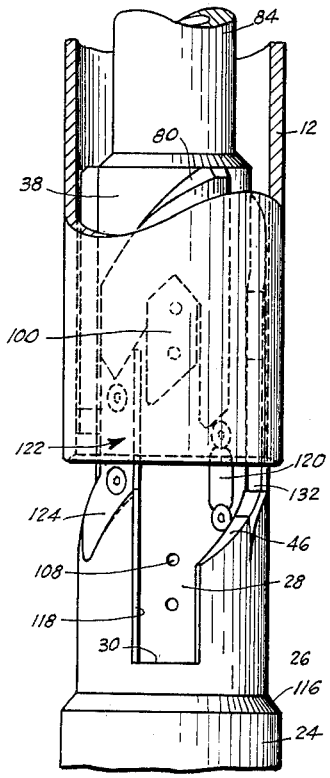
FIGURE 14 is a view similar to FIG. 12 depicting the spline members in another drive position.
Figure 16:
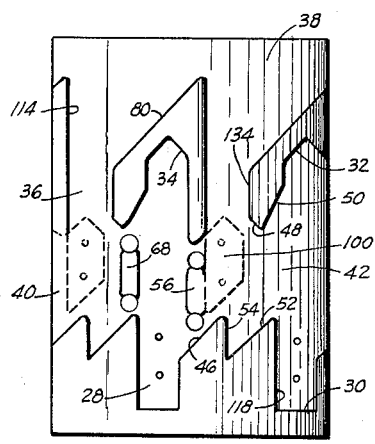
FIGURE 16 is a view similar to FIG. 15 depicting the spline members in a more advanced position of engagement therebetween.
Figure 15:
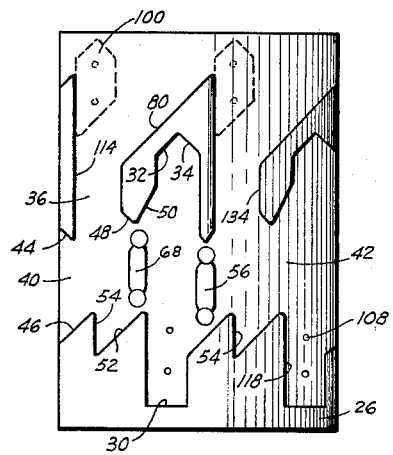
FIGURE 15 is a layout view of the cooperating spline members of the safety joint with portions shown in dotted lines for purposes of illustration and depicting the beginning position of engagement between the spline members.

The continued downward and right hand rotational movement of the drive body 12 will move the lugs over the depressed latches 68 and bring the tapered shoulder 106 into contact with the tapered shoulder 52 (FIG. 22). The lugs 100 tend to move downwardly and in a right hand rotational direction along the tapered surfaces 52 to a position adjacent the vertical shoulder 54 (FIGS. 9 and 23). Further rotational and downward movement of the drive body 12 will be precluded since the spline body 14 is stuck in the well bore along with the lower portion of the drill stem.

Figure 1A:
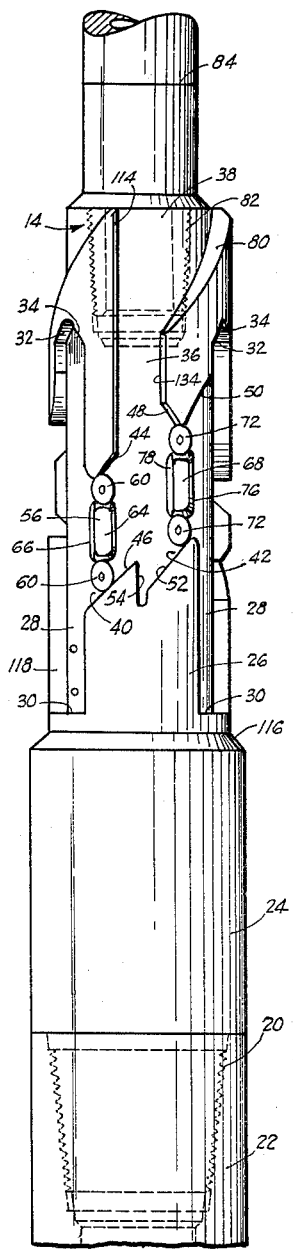
FIGURE 1A is a lower extension of FIG. 1.

The drill stem 18 is then raised or moved vertically upward in the well bore for raising of the drive sleeve 12. The lugs 100 will move upwardly until the tapered upper shoulders 102 thereof contact the tapered shoulder 48 on the spline body 14 as shown in FIG. 24. The tapered shoulders 102 and 48 cooperate for directing the lugs 100 into the grooves 36 whereby a continued vertical upward movement of the drive sleeve 12 will move the lugs 100 out of the grooves 36 through the open end 38 thereof to an unlatched position as shown in FIGS. 1 and 1A. The outer sleeve 12 is thus completely disconnected from the spline body 14 whereby the drill pipe 18 and drive body 12 connected thereto may be removed from the well bore.

It will be noted by an inspection of FIGS. 15 through 24 that the smallest height of the grooves 40 and 42 is less than the longest dimension of the lugs 100. Thus, the lugs 100 cannot move into the grooves 40 and 42 by a right hand rotational movement only, but must be moved downwardly with a simultaneous right hand rotational movement. This assures that both movements will be required during both the unlatching and latching of the safety joint 10. Furthermore, left hand rotation is precluded by the straight shoulders 66 and 78 of the spring latches 56 and 68, respectively. Left hand rotation of the drive body 12 will move the lugs 100 against the straight shoulders 66 and 78 and the latches will not be depressed by the lugs, thus precluding left hand rotational movement of the drive sleeve 12 with respect to the spline body 14.

Figure 2:
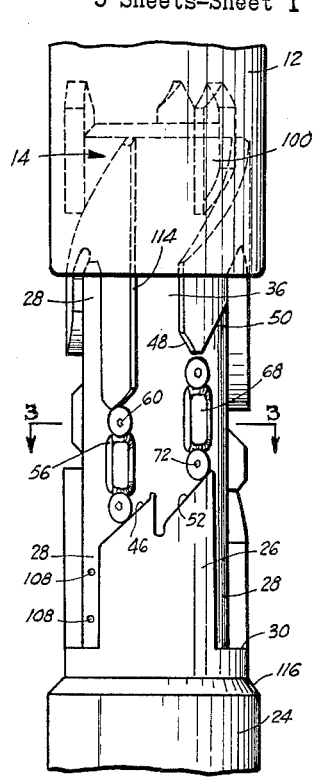
FIGURE 2 is a broken elevational view of the spline members of the safety joint in the beginning position of the engagement therebetween.

When it is desired to latch the drive body 12 with the spline body 14 for a connection of the safety joint 10, the outer sleeve 12 is moved downwardly in any well known manner (not shown) with a simultaneous right hand rotation to move the sleeve 12 over the drive body 14. The drilling fluid (not shown) circulating downwardly through the drill pipe 18 and sleeve 12 will wash the upwardly extending spline body 14 for cleaning thereof to facilitate the latching operation. As the reduced neck portion 26 enters the enlarged bore 98, the lugs 100 approach the open end 38 of the grooves 36. Normally the combined right hand torque and downward movement of the sleeve 12 will move the lugs 100 adjacent the vertical shoulder 114 provided at the left side of the grooves 36, as viewed in the drawings, and particularly shown in FIG. 15. However, if the lugs 100 are not brought into contact with the vertical shoulders 114, then the lower tapered shoulder 106 thereof will contact the helical shoulders 80, as shown in FIG. 2. The helical shoulders 80 and the tapered shoulders 106 will cooperate for automatically directing the lugs 100 into the grooves 36.

Figure 17:
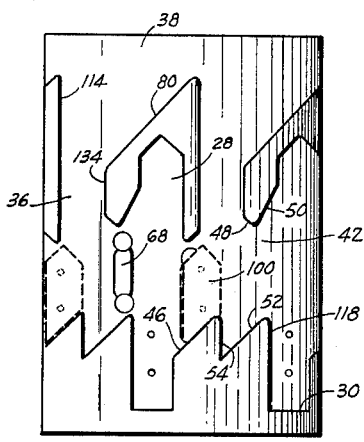
FIGURE 17 is a view similar to FIG. 15 depicting the spline members in a still more advanced position of engagement therebetween.

The continued downward and right hand rotational movement of the sleeve 12 will move the lugs 100 downwardly in the grooves 36 (FIG. 16) until the tapered shoulder 106 of the lugs contacts the tapered shoulder 46 of the groove 40 (FIG. 17). The lugs 100 will move downwardly along the tapered shoulder 46 and into the lower portion of the grooves 28, adjacent the lower shoulder 30 thereof (FIG. 18). It is preferable that the downward movement of the sleeve 12 over the spline body 14 be limited by the contact between the lower tapered shoulder 96 of the sleeve 12 with the tapered shoulder 116 provided on the body 24 at the juncture of the reduced neck portion 26 in order that the lugs 100 will not rest on the shoulder 30 in the latched position of the safety joint 10, as clearly shown in FIG. 5. This assures that the pointed lower end 117 of the lugs will not be dulled from contact with the shoulder 30. It will be apparent that the lower edge 96 of the sleeve 12 may be serrated, or reamer teeth (not shown), if desired.

The lugs 100 are in a driving position in the grooves 28 because the lugs will transmit rotation to the spline body 14 through contact with the vertical shoulders 118 of the left hand side of the grooves 28 (FIG. 18). Thus, continued downward movement and right hand torque on the drill pipe 18 will drive the lower portions of the drill stem, and the bit thereon, for continuing the well drilling operation.

After the latching operation, and when the lugs 100 are disposed in the grooves 28, the drill pipe 18 and sleeve 12 may be vertically raised in the well bore for moving the lugs 100 upwardly in the grooves 28 until the converging shoulders 104 and 102 of the lugs contact the converging shoulders 32 and 34 of the grooves 28 (FIGS. 6 and 20). This position of the lugs also provides a driving of the lower portions of the drill stem, and may be utilized for continuing the drilling operation, if desired. This position of the lugs 100 is particularly desirable when it is required that the weight on the bit be at a pre-determined amount, as is well known in the industry. The weight on the bit will then be equal to the weight of the drill pipe, drill bit and spline body 14 hanging from the lugs 100.

In addition, the lugs 100 disposed within the grooves 28 provide for a limited longitudinal movement of the sleeve 12 with respect to the spline body 14. Thus, when it becomes necessary to impart a jarring action to the lower portions of the drill stem for any reason, the drill pipe 18 and sleeve 12 may be reciprocated within the well bore whereby the shoulder 96 will bank against the shoulder 116 to provide a bumping or jarring action.

*Modified Structure*

Referring now to FIGS. 10 through 14, the safety joint 10 is modified in order that a left hand rotation combined with a vertical upward movement of the sleeve 12 may be utilized for unlatching of the safety joint in the event that the operator thereof should prefer such an unlatching operation. In order to modify the tool 10, the latch members 56 and 68 are removed from the spline body 14, along with the attendant spring members 62 and 74. A plug member 120 is secured in each of the recesses 58 in lieu of the latches 56 by the latch screws 60. The plugs 120 are disposed in the recesses 58 in such a manner that the outer periphery thereof is flush with the groove 50, thus providing no interference with the movement of the lugs 100 therein during either the latching or unlatching operation.

A key or plug 122 is disposed in each of the grooves 42 and is secured over the recesses 70 therein by the latch screws 72. The key 122 is of an angular configuration whereby an angularly disposed leg 124 thereof is disposed adjacent the shoulder 52 of the groove 42 to provide an extension for the shoulder 46 of the groove 40. The vertical leg 126 of the key 122 is provided with downwardly converging shoulders 128 and 130 at the upper end thereof for receiving the converging shoulders 48 and 50 of the groove 42, thus closing the groove 42. The left hand vertical shoulder 132 of the key 122 will be disposed in alignment with the right hand vertical shoulder 134 of the groove 36 to provide a continuous shoulder spanning the length of the closed groove 42.

The latching of the modified safety joint 10 as depicted in FIGS. 10 through 14 is similar to the latching operation of the preferred embodiment. A combined downward and right hand rotational movement is imparted to the sleeve 12 for moving the lugs 100 downwardly in the grooves 36. The lugs 100 will ride easily along the leg 124 and shoulder 46 for disposition within the groove 28, as hereinbefore set forth. However, the lugs 100 cannot move out of the groove 28 into the groove 42 by a right hand rotation of the sleeve 12 since the groove 42 is blocked by the key 122.

When it is desired to unlatch the modified tool, a vertical upward movement combined with a left hand torque is imparted to the drive sleeve 12 for moving the lugs 100 upwardly in the grooves 28 and over the plugs 120. A continued upward and left hand rotation of the sleeve 12 will move the lugs 100 into contact with the shoulder 132. The lugs 100 will move upwardly along the helical groove 80 for withdrawal through the open end 38 of the grooves 36, thus unlatching the drive sleeve 12 from the spline body 14. It will be noted that the unlatching of the modified safety joint is not dependent upon the tightness of any threaded connection, thus precluding any possibility of requiring sufficient torque whereby one of the threaded connections (not shown) in the drill stem may be accidentally unthreaded.

From the foregoing, it will be apparent that the present invention provides a novel safety joint adapted to be interposed in a drill stem, or for utilization with a fishing tool, or the like, whereby the upper portions of the drill stem may be easily disconnected from the lower portions thereof when the drill bit becomes stuck in the well bore, or when it is desired to remove the upper portion of the drill stem from the well bore for any reason. The safety joint is particularly designed and constructed to require a combined vertical and rotational movement for the latching and unlatching thereof, thus precluding accidental unthreading of one of the pipe connections in the drill stem. The novel tool may be utilized for jarring the lower portions of the drill stem for a dislodging thereof when the drill bit or drill stem has become stuck, but not sufficiently stuck to require a washing or reaming thereof. The safety joint may be easily and quickly latched and unlatched for facilitating the drilling and fishing operation.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:
1. A safety joint comprising an inner sleeve, an outer sleeve telescopically arranged with the inner sleeve, spline means on and cooperating between the inner and outer sleeves and responsive to a simultaneous downward and right hand rotation of the outer sleeve to latch the outer sleeve to the inner sleeve, said spline means responsive to an upward movement of the outer sleeve followed by a subsequent downward and right hand rotation of the outer sleeve for unlatching the outer sleeve from the inner sleeve, and yielding means on one of said sleeves having first surface means adapted for cooperation with the spline means to preclude a left hand rotation of the outer sleeve with respect to the inner sleeve and having second surface means cooperating with the spline means for depressing the yielding means upon right hand rotation of the outer sleeve.

2. A safety joint comprising an inner sleeve, an outer sleeve telescopically arranged with the inner sleeve, a plurality of male lugs provided on the inner periphery of the outer sleeve, a plurality of female splines provided on the inner sleeve and having open ends for receiving the lugs therein, said female splines are substantially J-shaped, said splines cooperating with said lugs and responsive to a combined downward and right hand rotational movement of the outer sleeve for moving the lugs into a driving position within the splines for latching the outer sleeve to the inner sleeve, said splines and lugs cooperating upon further downward and rotational movement of the outer sleeve for moving the lugs into a second position in the splines whereby a vertical upward and right hand rotational movement of the outer sleeve will unlatch the outer sleeve from the inner sleeve, and yielding means provided on the inner sleeve having first surface means for cooperation with the lugs to preclude left hand rotation of the outer sleeve during the latching or unlatching thereof, and said yielding means having second surface means cooperating with said lugs and depressible to permit the lugs to pass thereover upon a right hand rotation of the outer sleeve.

3. A safety joint comprising an inner sleeve, an outer sleeve telescopically arranged with the inner sleeve, a plurality of male lugs provided on the inner periphery of the outer sleeve, a plurality of substantially J-shaped grooves provided on the outer periphery of the inner sleeve and having open ends for receiving the lugs therein, said lugs and splines cooperating upon a simultaneous downward movement and right hand rotation of the outer sleeve for latching the outer sleeve to the inner sleeve, said lugs and splines providing for limited longitudinal movement of the outer sleeve with respect to the inner sleeve in the latched position thereof, said lugs and splines cooperating upon additional downward and right hand rotation movement of the outer sleeve subsequent to a vertical upward movement thereof to provide for unlatching of the outer sleeve from the inner sleeve, and yielding means on one of said sleeves having first and second surface means cooperating with the lugs to preclude left hand rotation of the outer sleeve with respect to the inner sleeve and depressible to permit the lugs to pass thereover upon a right hand rotation of the outer sleeve.

4. A safety joint comprising an inner sleeve, an outer sleeve telescopically arranged with the inner sleeve, a plurality of male lugs provided on the inner periphery of the outer sleeve, a plurality of substantially J-shaped grooves provided on the outer periphery of the inner sleeve and having open ends for receiving the lugs therein, said lugs and splines cooperating upon a simultaneous downward movement and right hand rotation of the outer sleeve for latching the outer sleeve to the inner sleeve, said lugs and splines providing for limited longitudinal movement of the outer sleeve with respect to the inner sleeve in the latched position thereof, said lugs and splines cooperating upon additional downward and right hand rotational movement of the outer sleeve subsequent to a vertical upward movement thereof to provide for unlatching of the outer sleeve from the inner sleeve, and yielding means provided in the grooves having first surface means for cooperating with the lugs to preclude left hand rotation of the outer sleeve, and said yielding means having second surface means cooperating with the lugs and depressible upon right hand rotation of the outer sleeve to permit the lugs to pass thereover.

5. A safety joint comprising an inner body, an outer tubular body telescopically arranged with the inner body, a plurality of spaced lugs provided on the inner periphery of the outer body, a plurality of longitudinally extending grooves provided on the inner body, each alternate groove provided with an open end for receiving the lugs therein, the other of said grooves provided with closed ends, a plurality of substantially horizontally extending grooves disposed on the inner body for providing communication between the open ended grooves and the closed ended grooves, said lugs and said grooves cooperating to provide a latching of the outer body to the inner body upon a downward and right hand rotational movement of the outer body, said lugs and said closed ended grooves providing limited longitudinal movement of the outer body with respect to the inner body in the latched position, said grooves and said lugs cooperating to provide for an unlatching of the outer body from the inner body upon additional downward and right hand rotational movement of the outer body subsequent to a vertical upward movement thereof, and yielding means disposed in the horizontal grooves having first surface means for cooperating with the lugs to preclude left hand rotational movement of the outer body, and said yielding means having second surface means cooperating with the lugs and depressible to permit the lugs to pass thereover upon right hand rotation of the outer body.

6. A safety joint comprising an inner body, an outer tubular body telescopically arranged with the inner body, a plurality of spaced lugs provided on the inner periphery of the outer body, a plurality of longitudinally extending grooves provided on the inner body, each alternate groove provided with an open end for receiving the lugs therein, the other of said grooves provided with closed ends, a plurality of substantially horizontally extending grooves disposed on the inner body for providing communication between the open ended grooves and the closed ended grooves, said lugs and the grooves cooperating to provide a latching of the outer body to the inner body upon a simultaneous downward and right hand rotational movement of the outer body, said grooves and lugs cooperating to provide for an unlatching of the outer body from the inner body upon additional downward and right hand rotational movement of the outer body subsequent to a vertical upward movement thereof, yielding means disposed in the horizontal grooves having first surface means for cooperating with the lugs to preclude left hand rotation of the outer body, said yielding means having second surface means cooperating with the lugs and depressible to permit the lugs to pass thereover upon right hand rotation of the outer body, and means cooperating between the outer and inner bodies for limiting the downward movement of the outer body with respect to the inner body.

7. A safety joint comprising an inner sleeve, an outer sleeve telescopically arranged with the inner sleeve, a plurality of lugs provided on the inner periphery of the outer sleeve, a plurality of substantially J-shaped grooves provided on the outer periphery of the inner sleeve and having at least one open end for receiving the lugs therein, said lugs and splines cooperating upon a simultaneous downward and right hand rotational movement of the outer sleeve for latching the outer sleeve to the inner sleeve, said lugs and splines cooperating upon additional downward and right hand rotational movement of the outer sleeve to provide for unlatching of the outer sleeve subsequent to a vertical upward movement thereof from the inner sleeve, yielding means provided in the grooves having first surface means for cooperating with the lugs to preclude left hand rotation of the outer sleeve in the latched position thereof, said yielding means having second surface means cooperating with the lugs and depressible to permit the lugs to pass thereover upon right hand rotation of the outer sleeve, and means carried on the end of the inner sleeve and cooperating with the outer sleeve for precluding leakage of fluid into the grooves in the latched position.

8. A safety joint comprising an inner tubular body, an outer tubular body telescopically arranged with the inner body, a plurality of spaced lugs provided on the inner periphery of the outer body, a plurality of spaced longitudinally extending grooves provided on the inner body, each alternate groove provided with an open end for receiving the lugs therein, the other of said grooves provided with closed ends, a plurality of substantially horizontally extending grooves disposed on the inner body for providing communication between the open ended grooves and the closed ended grooves disposed on opposite sides thereof, said lugs and said grooves cooperating to provide a latching of the outer body to the inner body upon a simultaneous downward and right hand rotational movement of the outer body, said lugs and said closed ended grooves providing limited longitudinal movement of the outer body with respect to the inner body in the latched position, said grooves and said lugs cooperating to provide for an unlatching of the outer body from the inner body upon additional downward and righ hand rotational movement of the outer body subsequent to a vertical upward movement thereof, radially movable means provided in the horizontal grooves which have surface configurations for cooperation with the lugs whereby said movable means are cammed radially inwardly thereby allowing said lugs to pass thereover during the right hand rotation movement of the outer body, but preclude left hand rotation of the outer body with respect to the inner body, means cooperating between the outer and inner bodies for limiting the downward movement of the outer body with respect to the inner body, shoulder means on the inner body engageable by said lugs to stop further rotative movement of said outer body when said lugs are aligned with said open ended grooves and means carried on the end of the inner body for cooperating with the outer body for precluding leakage of fluid in the grooves in the latched position between the outer and inner bodies.

9. A safety joint comprising an inner sleeve, an outer sleeve telescopically arranged with the inner sleeve, spline means on and cooperating between the inner and outer sleeves and responsive to a simultaneous downward and right hand rotation of the outer sleeve to latch the outer sleeve to the inner sleeve, said spline means providing for a limited longitudinal movement of the outer sleeve with respect to the inner sleeve in the latched position therebetween, said spline means responsive to a continued downward and right hand rotation of the outer sleeve subsequent to a vertical upward movement thereof for unlatching the outer sleeve from the inner sleeve, and yielding means provided on the inner sleeve having first and second surface means cooperating with the spline means for precluding left hand rotation of the outer sleeve with respect to the inner sleeve and depressible upon a right hand rotation of the outer sleeve to preclude interference with the unlatching of the outer sleeve from the inner sleeve.

10. A safety joint comprising an inner sleeve, an outer sleeve telescopically arranged with the inner sleeve, spline means on and cooperating between the inner and outer sleeves and responsive to a simultaneous downward and right hand rotation of the outer sleeve to latch the outer sleeve to the inner sleeve, said spline means responsive to an upward movement of the outer sleeve followed by a subsequent downward and right hand rotation of the outer sleeve for unlatching the outer sleeve from the inner sleeve, said inner sleeve disposed in an upwardly extending position for receiving the outer sleeve thereover upon vertical downward movement of the outer sleeve and yielding means carried by the inner sleeve and having first and second surface means cooperating with the spline means for precluding left hand rotation of the outer sleeve with respect to the inner sleeve and depressible upon right hand rotation of the outer sleeve to preclude interference with the unlatching of the outer sleeve from the inner sleeve.

References Cited in the file of this patent

UNITED STATES PATENTS

| | | |
|---|---|---|
| 2,250,463 | Boynton | July 29, 1941 |
| 2,327,503 | Coberly | Aug. 24, 1943 |
| 2,373,648 | Boynton | Apr. 17, 1945 |
| 2,779,344 | Muse | July 16, 1957 |
| 2,918,259 | Le Bus | Dec. 22, 1959 |